(12) United States Patent
Thomson et al.

(10) Patent No.: US 6,572,078 B1
(45) Date of Patent: Jun. 3, 2003

(54) CHANGOVER VALVE

(75) Inventors: Andrew Walter McRae Thomson, Avening (GB); Peter David Gammack, Bath (GB); Robert Brian Seaman, Bath (GB)

(73) Assignee: Dyson Limited, Malmesbury (GB)

( * ) Notice: Subject to any disclaimer, the term of this patent is extended or adjusted under 35 U.S.C. 154(b) by 0 days.

(21) Appl. No.: 09/806,930

(22) PCT Filed: Oct. 4, 1999

(86) PCT No.: PCT/GB99/03272
§ 371 (c)(1),
(2), (4) Date: Apr. 6, 2001

(87) PCT Pub. No.: WO00/21425
PCT Pub. Date: Apr. 20, 2000

(30) Foreign Application Priority Data

Oct. 8, 1998 (GB) .............................................. 9822002

(51) Int. Cl.⁷ ............................................... F16K 25/00
(52) U.S. Cl. ..................... 251/162; 251/259; 251/351; 137/874; 15/334
(58) Field of Search ................................. 251/162, 163, 251/158, 174, 351, 352, 251, 259; 137/874; 15/331, 334

(56) References Cited

U.S. PATENT DOCUMENTS

| | | | | |
|---|---|---|---|---|
| 3,834,418 A | * | 9/1974 | Clancy ........................ | 137/874 |
| 4,007,500 A | * | 2/1977 | Thompson et al. ......... | 251/254 |
| 4,376,322 A | | 3/1983 | Lockhart et al. | |
| 4,807,660 A | * | 2/1989 | Aslanian ...................... | 251/209 |
| 4,867,232 A | * | 9/1989 | Dewill ......................... | 251/162 |
| 5,318,275 A | * | 6/1994 | Sargent et al. .............. | 251/301 |
| 5,329,968 A | * | 7/1994 | Powell ......................... | 137/874 |
| 5,347,678 A | * | 9/1994 | Williams et al. ............. | 15/331 |
| 5,351,361 A | * | 10/1994 | Buchtel ........................ | 15/334 |
| 5,355,549 A | * | 10/1994 | Steinberg et al. ............ | 15/334 |
| 5,878,781 A | * | 3/1999 | Parker ......................... | 251/160 |
| 5,950,677 A | * | 9/1999 | Bhide ........................... | 137/874 |

FOREIGN PATENT DOCUMENTS

| | | | | |
|---|---|---|---|---|
| DE | 1241214 B | * | 5/1967 | |
| EP | 0037674 A | * | 10/1981 | ............. A47L/9/32 |
| EP | 0042723 A | * | 12/1981 | ............. A47L/9/16 |
| EP | 0134654 A | * | 3/1985 | ............. A47L/9/00 |
| FR | 701851 A | * | 3/1931 | |

OTHER PUBLICATIONS

Derwent abstract AN 94–262866 & DE 4305303.

* cited by examiner

Primary Examiner—Ehud Gartenberg
Assistant Examiner—John Bastianelli
(74) Attorney, Agent, or Firm—Morrison & Foerster LLP

(57) ABSTRACT

A changeover valve comprises a first valve member and a second valve member. The first value member has an aperture. The second valve member has first and second apertures. The first valve member is movable relative to the second valve member for selective alignment of the first value member aperture with one or other of the apertures of the second valve member. The value also has a ramp and follower means for automatically moving the valve member away from the one another during changeover movement of the first valve member relative to the second valve member so that wear on the surfaces of the valve members is minimized.

18 Claims, 5 Drawing Sheets

CHANGOVER VALVE

This application claims priority to International Application No. PCT/GB99/03272 which was published on Apr. 20, 2000.

TECHNICAL FIELD OF THE INVENTION

The present invention relates to a changeover valve, particularly but not exclusively to a changeover valve for a vacuum cleaner.

BACKGROUND OF THE INVENTION

An upright vacuum cleaner generally has a cleaner head rotatably mounted on the lower end of a main body in which dust separation apparatus is housed. The dust separation apparatus can be in the form of a conventional bag filter or in the form of a cyclonic separator consisting of one or two cyclones as shown and described in, for example, EP 0 042 723. A handle for propelling the cleaner across the floor to be cleaned is arranged to extend upwardly from or behind the main body. A pair of supporting wheels are mounted on the lower end of the main body or on the cleaner head. The cleaner head extends in a forward direction. A dirty-air inlet is located at the forward end of the cleaner head and facing downwardly so that, in use, the dirty-air inlet faces towards the surface to be cleaned. Dirty air is drawn into the dust separation apparatus via the dirty-air inlet by means of a fan driven by a motor. When the dirt and dust entrained within the air has been separated from the airflow in the separating apparatus, clean air is expelled into the atmosphere.

Upright vacuum cleaners are commonly convertible into cylinder cleaners. In the cylinder mode, the dirty air is drawn into the cleaner by way of a wand or hose attached to the vacuum cleaner instead of by way of the dirty air inlet located in the cleaner head. This cylinder mode facilitates cleaning of areas which cannot be easily reached by the cleaner head, for example, underneath furniture, on stairs or above the floor. The handle which is used to propel the vacuum cleaner across the floor in the upright mode is in some cases convertible into a wand and hose arrangement for this purpose. In either mode, it is necessary for the dirty air inlet which is not being used to be blocked or disconnected from the dust separating apparatus so that air is drawn into the cleaner only by way of the inlet suitable for the current mode of use.

The selection of the appropriate dirty-air inlet is carried out automatically in some known prior art machines in response to the positioning of the body and/or handle of the cleaner with respect to the cleaner head during cleaning. When the handle of the vacuum cleaner is put into a vertical position, ie the machine is being used in the cylinder mode, the dirty-air inlet is provided by a hose and wand attached to the vacuum cleaner and the inlet located in the cleaner head must be inoperative. When the handle is inclined with respect to the vertical, ie the vacuum cleaner is being used in the upright mode, the dirty-air inlet in the cleaner head is to be used and the dirty-air inlet in the hose and wand becomes redundant and must be disconnected from the dust separation apparatus. The changeover between the dirty-air inlets has previously been effected by sliding or rotating valves. An example of a rotating changeover valve is disclosed in EP 0 134 654 B. A disadvantage of the known valves used for this purpose is that, in order to effect the changeover, two abutting surfaces are made to slide across one another. This causes wear on the valve surfaces and particularly on the seals which surround the openings of the air passages. If the seals wear, the air passages cease to be airtight and losses can then occur which reduces the efficiency of the machine, particularly if it includes cyclonic separating apparatus. Wear can also occur at the pivoting supports of the movable part of the valve which can result in misalignment of the air passages and an increase in losses. Sliding changeover valves, in which the valve slides between its different positions, are also known but such valves also have the disadvantage that the valve surfaces, and in particular the surfaces of the valve seals, become worn down through the sliding contact over time. A further disadvantage of known changeover valves is that, if the seals do wear through use, the valve is difficult to access and replacing the valve or the seals of the valve is awkward and time consuming. A still further disadvantage of some known arrangements is that, immediately downstream of the valve, the airflow path includes a chamber having an enlarged cross-section in which the airflow expands and decelerates. This deceleration can lead to an accumulation of debris in or near the valve and this can lead to the valve becoming jammed or clogged. Expansion of the airflow path can also lead to power losses.

SUMMARY OF THE INVENTION

An object of the present invention is to provide a changeover valve in which the valve surfaces are less prone to wear during the changeover motion than in current changeover valves. A further object is to provide a changeover valve which is simple and cheap to manufacture but which is effective in use. A further object is to provide a changeover valve which can be easily and quickly accessed for maintenance, should any such maintenance be required. A still further object is to provide a valve in which the cross-sectional area of the airflow path is maintained constant or near-constant.

The provision of ramp and follower means on the valve members to move the valve members away from one another during changeover movement means that the valve members are out of contact with one another during the major part of the changeover movement. This reduces the wear suffered by the components and particularly by the seals located on the components. Reducing the wear on the seals prolongs the useful life of the changeover valve and improves performance during that time. Furthermore, the arrangement allows a positive sealing force to be applied when the valve is operational and this improves the seal achieved by the valve.

In a preferred embodiment of the invention, the changeover valve is incorporated in a vacuum cleaner. The first aperture of the second valve member communicates with the hose and wand and the second aperture communicates with the air inlet in the cleaner head. When the main body of the cleaner is in an upright position and the cleaner is in cylinder mode, the first valve member is automatically aligned with and sealed across the first aperture to allow the passage of air from the hose and wand to the dust separation apparatus. The dirty-air inlet in the cleaner head is automatically shut off. When the main body of the vacuum cleaner is inclined away from the vertical to put the cleaner into the upright mode, the movement of the main body relative to the cleaner head causes the first valve member to lift away from the first aperture of the second valve member so that the first valve member is no longer sealed against the first aperture of the second valve member. The first valve member is then moved to the second aperture of the second valve member whilst it is out of contact with the second valve member. It is then aligned with and sealed across the second aperture of the second valve member. In this position, air is allowed to flow from the cleaner head to the dust separating apparatus and the dirty-air inlet of the hose and wand is automatically shut off.

In a further preferred embodiment of the invention, one of the valve members has a portion on its surface which is located adjacent the periphery of the aperture or apertures and is shaped so that it acts as a ramp. The follower is formed by a protrusion on a surface of the other valve member. This protrusion is also located adjacent the periphery of the aperture or apertures. The protrusion may be in the form of a tongue or a nodule.

A further embodiment of the invention provides locking means to ensure that the first valve member is secured in position when aligned, with the second aperture even when the main body is inclined at different angles. Use of the vacuum cleaner in the upright mode involves frequent changes in the angle of inclination of the main body of the vacuum cleaner with respect to the vertical. It is important that the first valve member remains aligned with and sealed across the second aperture of the second valve member throughout this movement so that the air passage between the inlet and the dust separation apparatus is maintained.

The locking means preferably comprises a first catch on the first valve member which co-operates with a corresponding second catch on the main body of the cleaner. The second catch is pivotable and biased into a locking position so that the first valve member is held in alignment with the second aperture irrespective of the angle of inclination of the handle. The locking means is released by the action of a release member when the main body of the vacuum cleaner is returned to the upright position. The release member may be attached directly to, or form part of, the cleaner head casing.

BRIEF DESCRIPTION OF THE DRAWINGS

An embodiment of the invention will now be described with reference to the accompanying drawings, wherein.

DETAILED DESCRIPTION OF THE INVENTION

Figure 1:
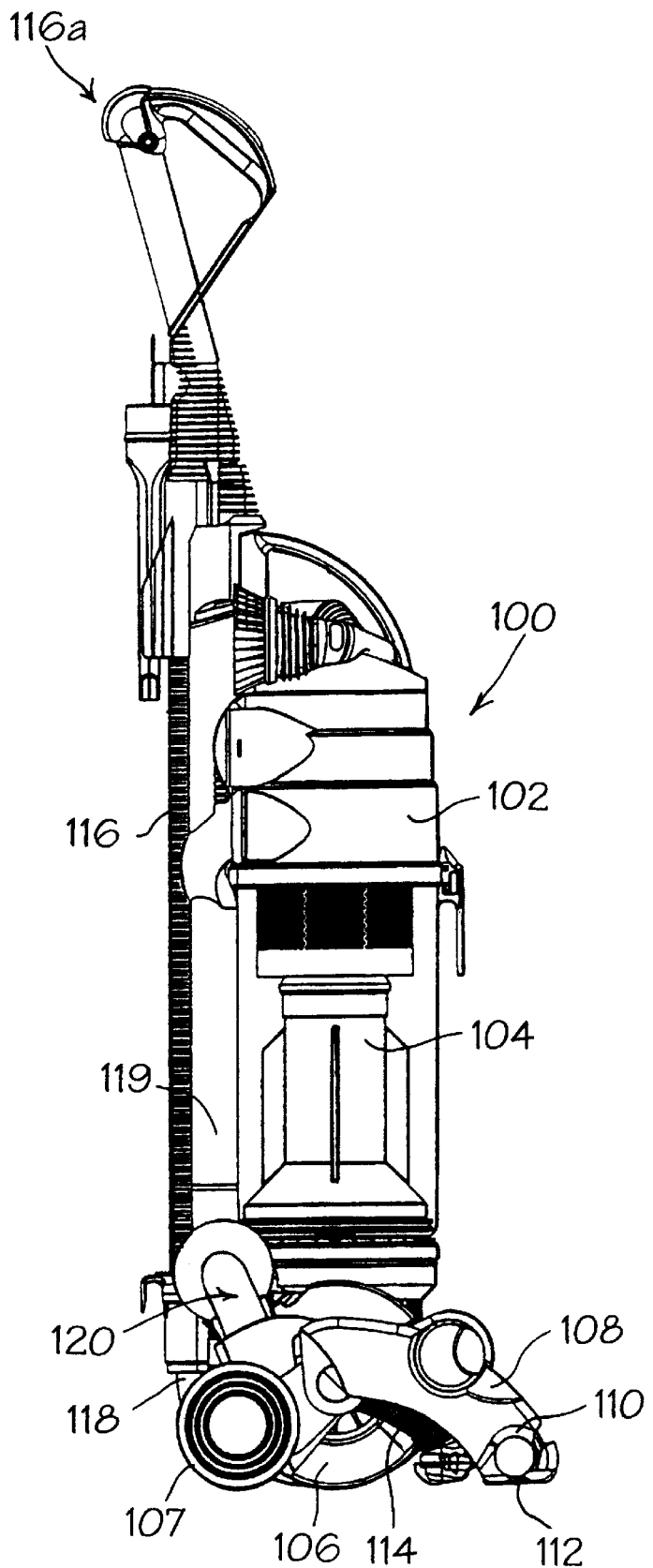
FIG. 1 side view of an upright vacuum cleaner with the handle and main body in an upright position ready for use in cylinder mode and incorporating a changeover valve according to the invention.
Figure 2:
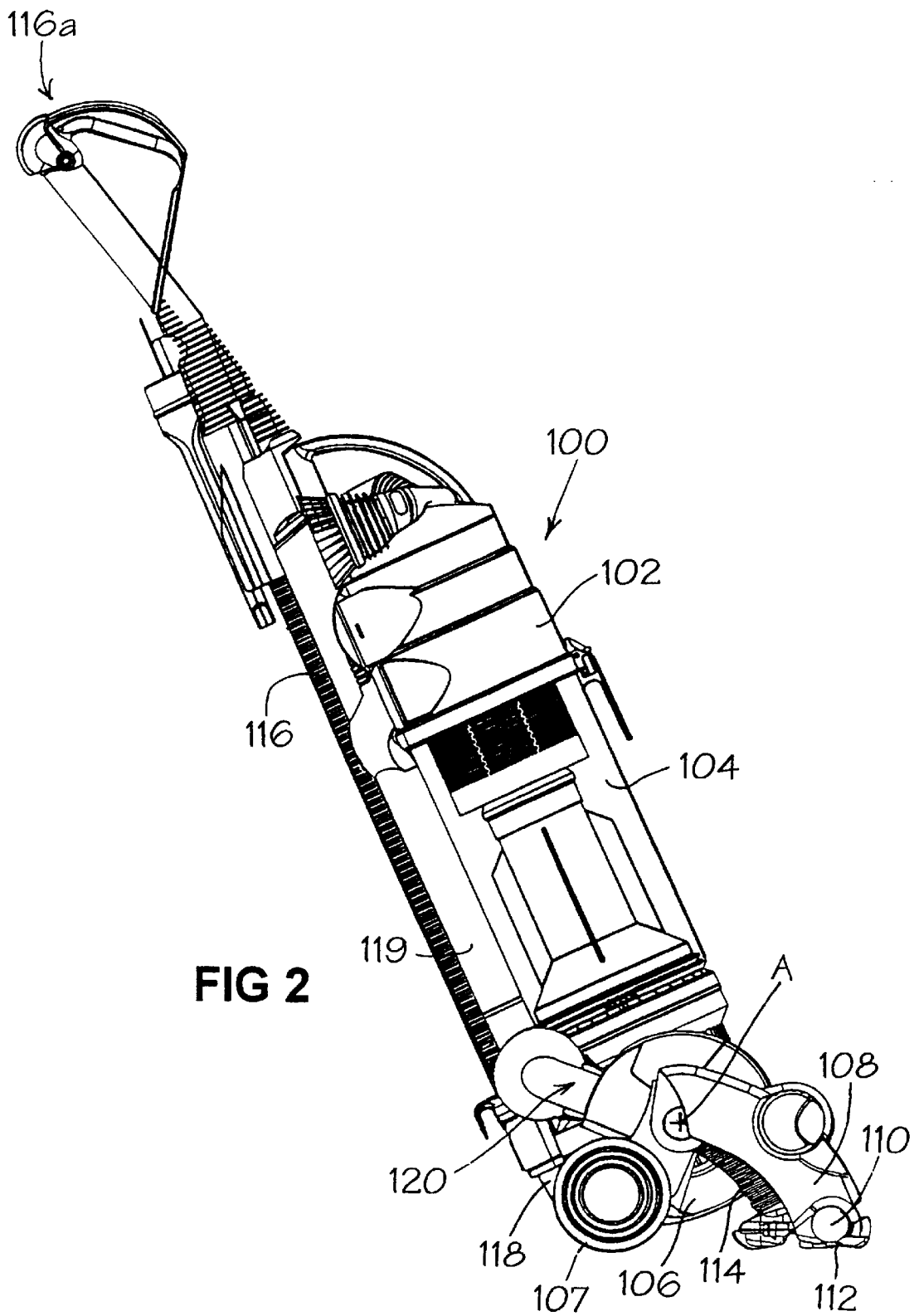
FIG. 2 is a side view of the upright vacuum cleaner of FIG. 1 with the handle and main body inclined to the vertical as it would be when used in the upright mode.

FIGS. 1 and 2 illustrate the overall construction of an upright vacuum cleaner incorporating a changeover valve according to the invention. The vacuum cleaner 100 has a main body 102 in which dust separation apparatus 104 is housed. In this embodiment the dust separation apparatus 104 is cyclonic dust separation apparatus consisting of two cyclones arranged in series. Apparatus of this type is well known and will not be described any further here because it has no material effect on the invention. A motor housing 106 is located at the lower end of the main body 102 and forms part of the main body 102. Supporting wheels 107 are mounted directly on the motor housing 106. A cleaner head 108 is rotatably mounted on the motor housing 106 about an axis A. The cleaner head 108 has a brush housing 110 with a downward facing inlet 112 arranged at the forward end of the cleaner head 108. A changeover valve 120 is located on the main body 102 in the vicinity of the motor casing 106. A flexible duct 114 extends between the brush housing 110 and the changeover valve 120 as will be explained below.

A handle 116 extends upwardly from the lower part of the main body 102 and lies alongside the rear part of the main body 102. When the cleaner 100 is to be used in the upright mode, the handle extends upwardly beyond the main body 102 so that it can be gripped by a user and used to manoeuvre the cleaner 100 across a surface to be cleaned. The handle 116 is, however, releasable and may be used as a hose and wand assembly.

This can be achieved in several ways and examples are shown and described in EP 0 037 674 and EP 0 134 654. The lower end of the hose/wand 116 is connected via a ducting 118 to the changeover valve 120 as will be explained below.

When the cleaner 100 is in the position shown in FIG. 1, the changeover valve 120 automatically connects the dust separating apparatus 104 to the wand and hose 116 so that cleaner can be used in cylinder mode for above the floor cleaning. Air is drawn into the cleaner through the distal end 116a of the wand which can be released from the cleaner for appropriate manipulation. The inlet 112 in the cleaner head 108 is automatically shut off. When the cleaner 100 is to be used in conventional upright mode, the handle is restored to the position shown in FIG. 1 and then inclined to the vertical as shown in FIG. 2. The changeover valve 120 automatically shuts off the air inlet at the distal end 116a of the wand and connects the dust separating apparatus 104 to the inlet 112 in the cleaner head 108. The valve 120 is maintained in this position, as will be described below, during the use of the cleaner 100 in the upright mode, irrespective of the angle of inclination of the handle 116 to the vertical.

In all cases, ie in the upright mode and in the cylinder mode, a motor (not shown) located in the motor casing 106 drives a fan (also not shown) so as to draw air into the cleaner 100 via the appropriate inlet, conduct it to the dust separating apparatus 104 in the main housing 102 and then expel the cleaned air to the atmosphere. The cleaned air is preferably caused to flow past the motor so as to cool it before being expelled.

Figure 3:
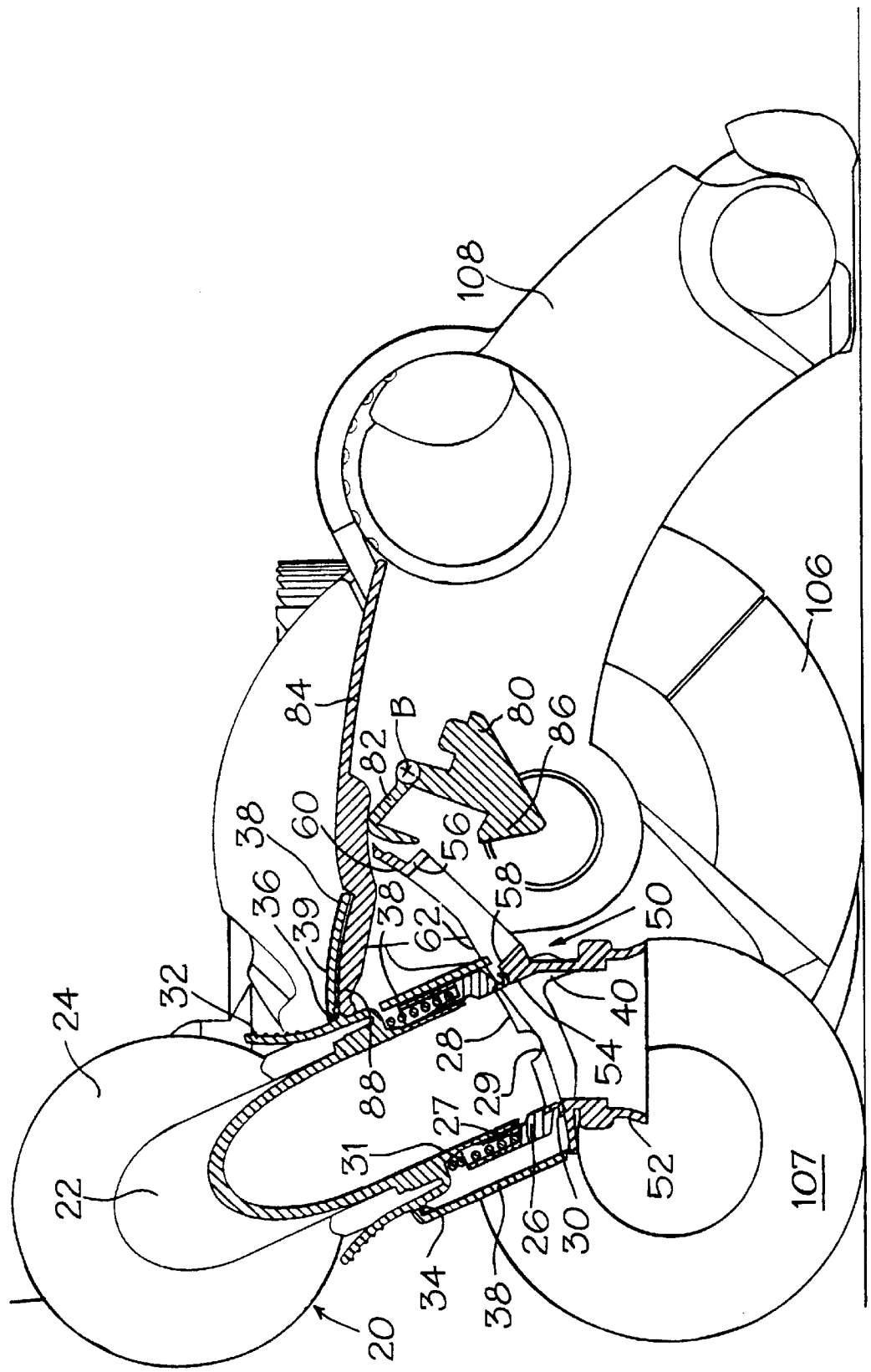
FIG. 3 is a sectional view of the cleaner head of the vacuum cleaner of FIGS. 1 and 2 showing the changeover valve in a first operational position.
Figure 4:
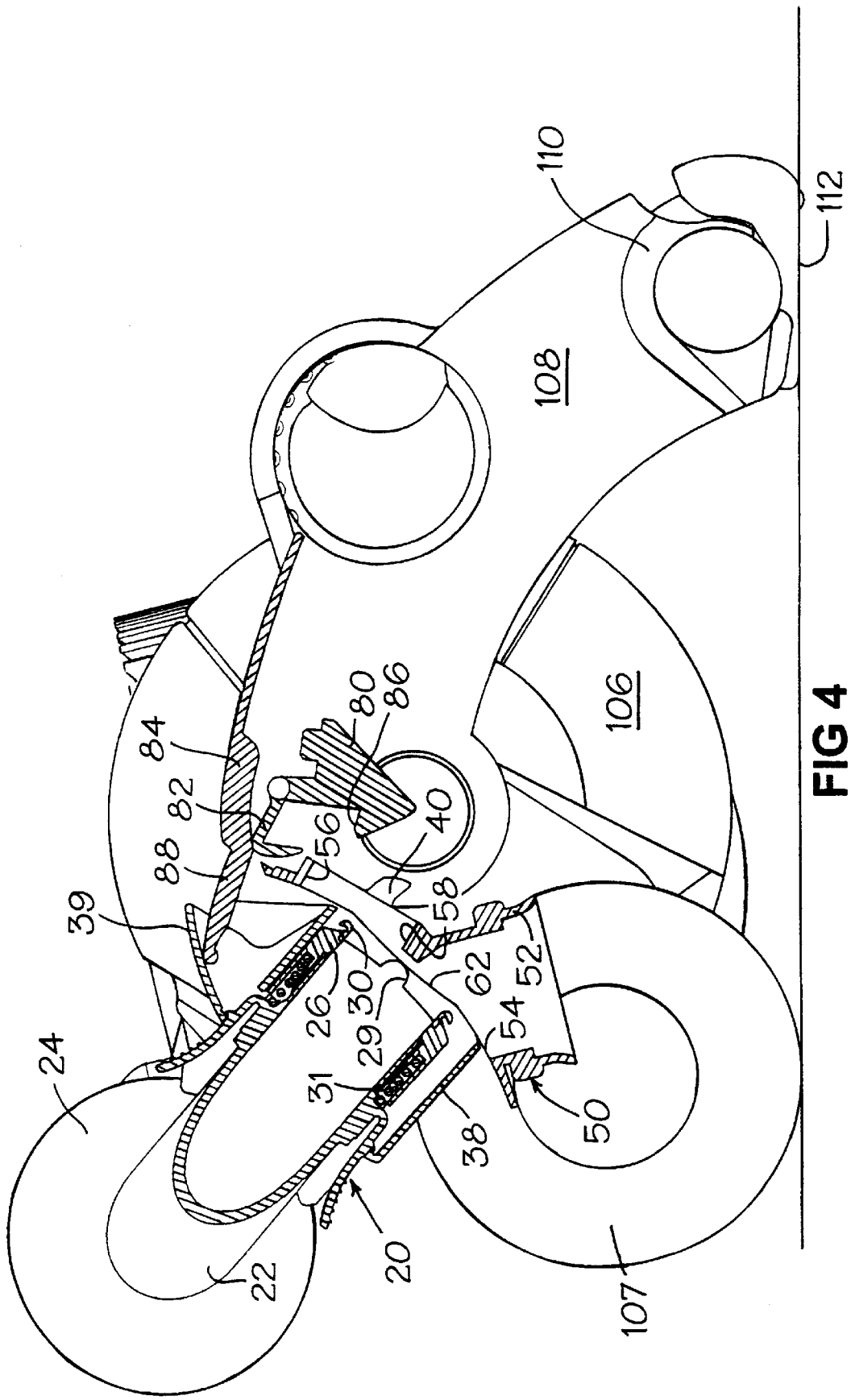
FIG. 4 is a sectional view of the cleaner head of FIG. 3 showing the changeover valve in an intermediate position.
Figure 5:
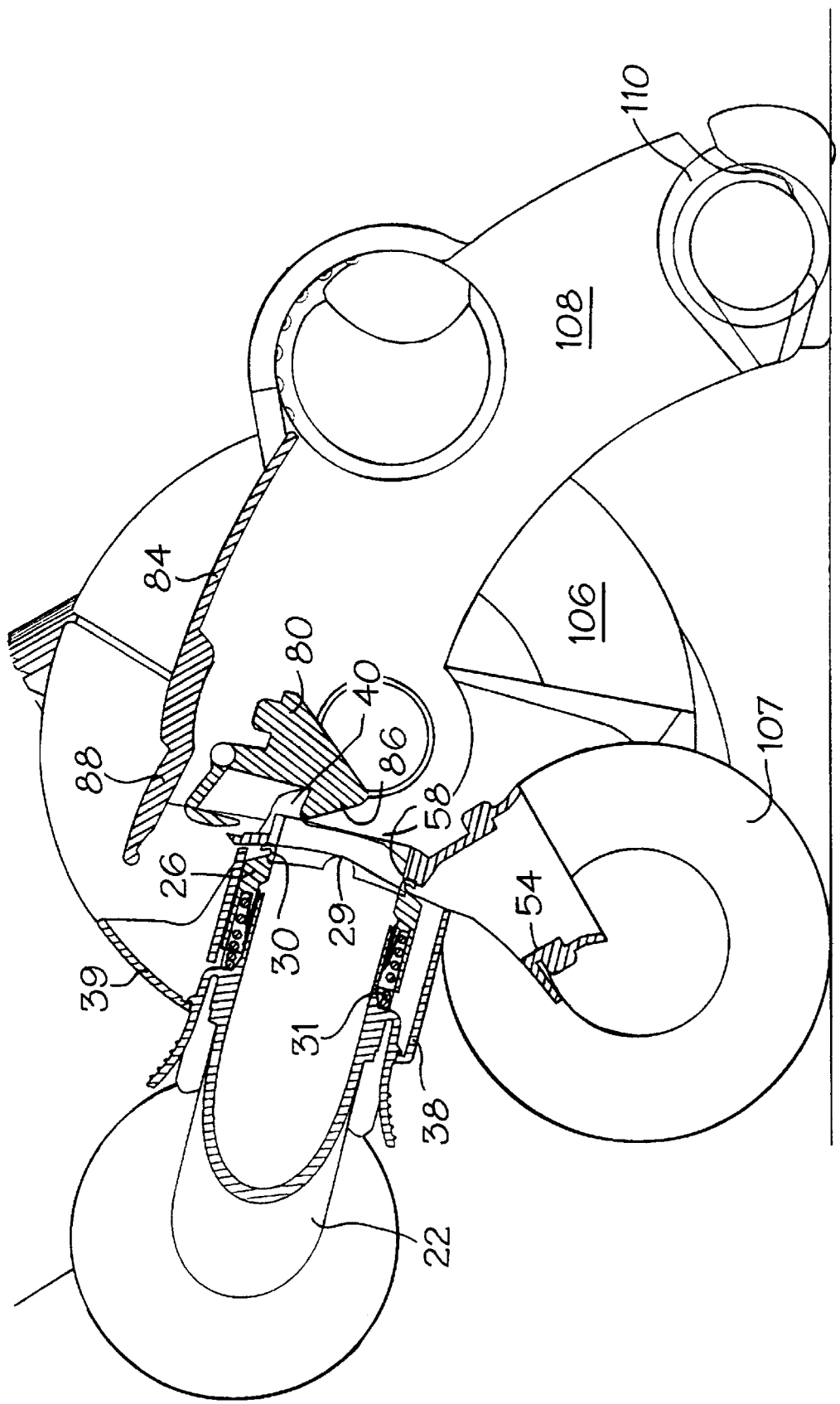
FIG. 5 is a sectional view of the cleaner head of FIG. 3 showing the changeover valve in a second operational position.

FIGS. 3 to 5 show in detail the changeover valve 120 according to the invention. The changeover valve 120 has a first valve member 20, a second valve member 50 and a carriage 38, each of which may be made of metal or plastics or any other suitable material although plastics is preferred for ease of manufacture and lightness of weight. The first valve member 20 consists essentially of a tubular conduit 22. The upper end of the conduit 22 is supported by and communicates with ducting 119 which will carry the airflow to the dust separating apparatus 104 in the main body 102. The upper end of the conduit 22 has an enlarged circular flange 24 which co-operates with a similar flange located at the end of the ducting 119 leading to the dust separating apparatus 104. The flange 24 carries a collar (not shown) over no more than half of its circumference, specifically the upper half. This collar projects outwardly from the flange 24 and extends over the similar flange located on the ducting 119. The location of the collar on the upper half of the flange 24 allows the first valve member 20 to be moved relative to the ducting 119 in an upward direction. A seal is provided between the flange 24 and the similar flange to maintain an airtight airflow path through the ducting 119. The location of the collar about the circumference of the flange 24 allows the conduit 22 to rotate with respect to the ducting 119, within certain limits, about the centre of the flange 24 without compromising the communication between the first valve member 20 and the ducting 119. Furthermore, the alignment of the respective valve members is maintained. Nevertheless, other rotatable connections are equally suitable. The lower end of the conduit 22 is surrounded by a sleeve 26 which defines an aperture 28 which is surrounded by a seal 30. The seal 30 may be attached to the sleeve 26 by any one of several methods, including friction, adhesion and welding. The seal 30 is designed and dimensioned to contact the second valve member 50 when the valve 120 is in use. The seal 30 is resilient so that its resistance to movement is slight when there is relative movement between the first valve member 20 and the second valve member 50. The seal 30 may be made of any suitable material, for example rubber or synthetic rubber.

The sleeve 26 surrounds the lower end of the conduit 22 and is slidably movable in an axial direction with respect to the conduit 22. The sleeve 26 includes an inwardly projecting seal 27 which presses against the outer surface of the conduit 22 to form a seal therewith. The seal 27 moves up and down with respect to the conduit 22 with the sleeve 26 so as to maintain the sealing connection at all times. The seal 27 can be formed by a resilient lip or by a rolling diaphragm or other suitable seal means. The sleeve 26 is biased in the downward direction by a compression spring 31 acting between a shoulder of the conduit 22 and a seat of the sleeve 26. The sleeve 26 is thereby pressed away from the flange 24 at all times. A nodule 29 projects downwardly from the periphery of the aperture 28 on either side of the sleeve 26. The nodules 29 project downwardly as far as the ramps 62 which will be described below. The nodules are semicircular in shape and have a diameter of approximately 7 mm. The purpose of the nodules 29 will be explained below.

The conduit 22 of the first valve member 20 carries a pair of outwardly extending arms 32 which can be moulded separately and affixed thereto or else moulded integrally therewith. The arms 32 are resilient and include projecting lips 34 which are designed to engage beneath co-operating lips 36 located on a carriage 38 which is movably mounted on the second valve member 50 so as to be able to move between a first position in which the first valve member 20 is located over the first aperture 54 and a second position in which the first valve member 20 is located over the second aperture 58. The means of mounting the carriage 38 on the second valve member 50 can include downwardly projecting tongues located on the carriage 38 which are slidably received in slots or grooves in the second valve member 50. These features are not shown in the Figures for the sake of clarity. They augment the support provided to the first valve member 20 by the flange on the ducting 119 co-operating with the flange 24. The first valve member 20 is, in use, always pivotable about the centre of the flange 24. The carriage 38 has a forwardly projecting portion 39 whose purpose will be described below. The resilience of the arms 32, which is preferably inherent in the component due to the nature of the material from which it is made, allows the arms 32 to be depressed towards the conduit 22 which allows the first valve member 20 to be released from its operational position (shown in the Figures) for inspection, maintenance or repair if necessary.

The second valve member 50 is mounted on the motor casing 106 and comprises a first conduit 52 which defines a first aperture 54 at the upper end thereof. The first conduit 52 is connected to the hose and wand 116 by means of a portion of ducting (not shown for reasons of clarity). The second valve member 50 also comprises a second conduit 56 which defines a second aperture 58 at one end thereof. The first and second apertures 54, 58 are located adjacent one another in an arcuate surface which is generally part-cylindrical. The second conduit 56 is connected to the cleaner head 108 by way of the flexible duct 114 (not shown in FIGS. 3 to 5 for reasons of clarity). When the aperture 28 of the first valve member 20 is seated over the first aperture 54, the motor will draw air into the dust separating apparatus 104 via the hose and wand. When the aperture 28 of the first valve member 20 is seated over the second aperture 58, the motor will draw air into the dust separating apparatus 104 via the inlet 112 in the cleaner head 108.

The upper surface 60 of the second valve member 50 facing the first valve member 20 includes two ramps 62 forming part of a ramp and follower means. The ramps 62 lie on either side of the apertures 54, 58 and along side the apertures 54, 58 when viewed from above. The ramps 62 are shaped so that their surfaces are raised above the part-cylindrical surface in which the apertures 54, 58 lie, the surfaces of the ramps 62 increasing in distance from the part-cylindrical surface towards the centre of the ramps 62. The nodules 29 form the followers of the ramp and follower means. Since the nodules 29 are located centrally of the aperture 28 Of the first valve member 20, the ramps 62 begin and end in alignment with the centres of the apertures 54, 58 of the second valve member 50.

Releasable locking means are provided to retain the first valve member 20 in alignment with the second aperture 58 even when the inclination of the main body 102 and handle 116 is varied during upright cleaning. The releasable locking means comprise a first catch 40 located on the carriage 38 which, as previously mentioned, is movably mounted on the second valve member 50. The first catch 40 depends from the lower surface of the carriage 38 and has an arcuate forward or leading edge as shown. A second catch 80 is mounted on the motor casing 106 so as to be pivotable about an axis B located in the vicinity of the second aperture 58 of the second valve member 50. The second catch 80 is biased in a clockwise direction by means of a spring or other resilient member (not shown). The second catch 80 also has a generally upwardly extending releasing member 82 which has a smoothly rounded upper end. This upper end of the releasing member 82 co-operates with a pressing member 84 forming part of the upper casing of the cleaner head 108. The second catch 80 also has, a catch member 86 which extends generally towards the second valve member 50 and incorporates a tooth which is designed to interengage with the first catch member 40. The pressing member 84 and the catches 40 and 80 together form the releasable locking means.

The pressing member 84, which is formed by the upper casing of the cleaner head 108, also has a rear portion which forms an actuating member 88. The actuating member 88 is shaped so as to have a slightly arcuate upper surface and a rounded distal end. The arcuate shape of the upper surface of the actuating member 88 is the same as the underneath surface of the forwardly projecting portion 39 of the carriage 38 so that the two surfaces cooperate with one another and lie alongside one another when the handle 116 is in the vertical position as shown in FIG. 3. However, the upper surface of the actuating member 88 has no function other than to support the distal end of the actuating member 88 and therefore the shape thereof is not important. The distal end of the actuating member 88 is located so that it extends towards and touches a part of the first valve member 20, for example the lower end of the arm 32 of the conduit 22, when the handle is in the vertical position as shown in FIG. 3, but without pressing thereagainst.

When the vacuum cleaner 100 is to be used in the cylinder mode, the handle 116 is moved to a substantially vertical position as shown in FIG. 1. The first valve member 20 is aligned with the first aperture 54 of the second valve member 50 as shown in FIG. 3. The seal 30 is pressed against the upper surface of the second valve member 50 around the first aperture 54 to create an airtight passageway through the changeover valve 120. This is achieved by means of the action of the spring 31 urging the sleeve 26 downwardly away from the conduit 22. The fixed position of the main body 102 with respect to the cleaner head 108 in the cylinder mode means that there is no tendency for the first valve member 20 to move out of this position. The seal 30 remains in contact with the periphery of the aperture 54. Since the conduit 52 is in communication with the hose and wand, the positioning of the handle 116 in the vertical position means that the cleaner 100 will operate as a cylinder machine and dirty air will be sucked into the dust separating apparatus only by way of the hose and wand. The handle 116 can then be released and used in the manner of a wand for above the floor cleaning.

It will be seen from FIG. 3 that, when the cleaner 100 is in this position, the pressing member 84 is in contact with the releasing member 82 so that the second catch 80 is pressed in an anti-clockwise direction against the action of the biasing means. The second catch 80 is thus held in a position which enables it to receive the first catch 40 when the first valve member 20, together with the carriage 38, is moved into alignment with the second aperture 58 of the second valve member 50. If the second catch member 80 were not held in the position illustrated in FIG. 3, the second catch 80 could be forced to receive the first catch 40 by means of the arcuate forward end of the first catch 40 co-operating with the inclined rearward end of the catch member 86 to press the second catch member in an anti-clockwise direction.

When the cleaner is to be used in the upright mode, as shown in FIG. 2, the handle 116 is restored to the cleaner 100 as shown in FIG. 1 and the main body 102 is then moved to an inclined position by rotating the main body 102 with respect to the cleaner head 108. Since the second valve member 50 is mounted on the main body 102, the second valve member 50 is also rotated with respect to the cleaner head 108. Because the wheels 107 are mounted on the motor casing 106 at the bottom of the main body 102, the axis of rotation A of the cleaner head 108 with respect to the main casing 102 is raised away from the floor. The cleaner head 108 therefore moves as though it were pivoting in a clockwise direction about the brush housing 110 and the rear of the cleaner head 108 is therefore lifted. The actuating member 88 lifts against the forwardly projecting portion 39 of the carriage 38 and forces the carriage to move forwardly with respect to the second valve member 50. The carriage 38 carries the first valve member 20 with it and the sleeve 26 is thus forced to travel with carriage along the second valve member 50. The nodules 29 travel along the ramps 62 and the inclination of the ramps 62 forces the sleeve 26 to move upwardly away from the second valve member 50, thus breaking the seal between the sleeve 26 and the first aperture 54.

The intermediate position of the changeover valve 120 is shown in FIG. 4. This is the point at which the sleeve 26 is retracted away from the second valve member 50 by the furthest possible amount. It can clearly be seen that the seal 30 is out of contact with the second valve member 50. This action results in less wear of the seal 30 than would be the case if the changeover valve 120 were to actuate the changeover merely by causing the seal 30 to slide along the surface of the second valve member 50.

The nodules 29 of the first valve member 20 continue to travel along the ramps 62 until they reach the end thereof. At this point, the seal 30 is located over the second aperture 58 in the second valve member 50 and the sleeve 26 has been allowed to approach the second valve member 50 under the action of the spring 31. The second operational position is illustrated in FIG. 5.

As the carriage 38 approaches the second operational position shown in FIG. 5, the first catch 40 approaches the second catch 80. Simultaneously, as described above, the pressing member 84 lifts away from the position shown in FIG. 3 to the position shown in FIG. 5. As the first catch 40 passes the second catch 80, the pressing member 84 releases the second catch 80 and the second catch moves in a clockwise direction under the action of the spring or other biasing means mentioned above. Whilst the first and second catches 40,80 remain in engagement in this manner, the carriage 38 is held in alignment with the second aperture 58 in the second valve member 50 and the dirty air is drawn into the cleaner by way of the cleaner head 108 irrespective of the angle of inclination of the handle 116 to the vertical.

When the cleaner 100 is to be returned again to the cylinder mode of operation, the handle 116 is returned to the upright position. The rotation of the motor casing causes the axis A to drop again and the cleaner head 108 therefore effectively rotates in an anti-clockwise direction about the brush housing 110. The pressing member 84 therefore drops down from the position shown in FIG. 5. Initially, the pressing member 84 contacts the releasing member 82 which causes the second catch 80 to rotate against the action of the biasing spring and thereby release the first catch 40 from the retained position shown in FIG. 5. As the pressing member 84 drops further down towards the floor, the actuating member 88 comes into contact with the carriage 38 and, ultimately, becomes lodged underneath the forwardly projecting portion 39. Further downward movement of the actuating member 88 forces the carriage 38 to move to the left as shown in the drawings and back towards the first aperture 54 of the second valve member 50. Again, the nodules 29 co-operate with the ramps 62 to move the sleeve 26 away from the second valve member 50 so that, during the majority of the changeover movement, the seal 30 is out of contact with the second valve member 50. The return to the cylinder mode position is complete when the nodules 29 have reached the left hand ends of the ramps 62.

The conduit 22 and the sleeve 26 are removable from the cleaner 100 for inspection, maintenance or repair if necessary. The flange 24 located at the upper end of the conduit 22 is designed to be sealingly connectable to the ducting 119 by means of a sliding fit. The connection is made by sliding the flange 24 downwardly over the corresponding flange of the ducting 119 so that, when it is necessary to remove the conduit 22 and sleeve 26 for any reason, the flange 24 merely has to be slid in an upward direction to effect removal. This allows, not only the conduit 22 and sleeve 26 to be inspected and unblocked if necessary, but it also allows the apertures of the second valve member 50 to be inspected for blockages and accessed very easily.

All of the components of the above described device are preferably moulded from a plastics material, with the exception of the springs. This provides an arrangement which can be incorporated into a vacuum cleaner at relatively low cost, but which will greatly enhance the length of the reliable life of the changeover valve and improve the overall performance of the vacuum cleaner.

What is claimed is:

1. A changeover valve comprising a first valve member having an aperture, a second valve member having two apertures, the first valve member being movable relative to the second valve member for selective alignment of the first valve member apertures with one of the apertures of the second valve member, and ramp and follower means for automatically moving the first and second valve members away from one another during changeover movement of the first valve member relative to the second valve member.

2. A changeover valve as claimed in claim 1, wherein the ramp and follower means comprises a shaped surface on the second valve member forming a ramp.

3. A changeover valve as claimed in claim 1, wherein the ramp and follower means comprises a protrusion on the first valve member forming a follower.

4. A changeover valve as claimed in claim 3, wherein the protrusion comprises at least one nodule located on the first valve member.

5. A changeover valve as claimed in claim 4, wherein the nodule is substantially semi-circular in shape.

6. A changeover valve as claimed in claim 1, wherein a seal is provided on the first valve member of the valve for sealing the first valve member against the first or second aperture of the second valve member.

7. A changeover valve as claimed in claim 1, wherein the first valve member is removable, at least in part, to allow for removal of blockages.

8. A changeover valve as claimed in claim 1, wherein a releasable locking means is provided for releasably locking the first valve member in alignment with the second aperture of the second valve member.

9. A changeover valve, comprising a first valve member having an aperture, a second valve member having two apertures, the first valve member being movable relative to the second valve member for selective alignment of the first valve member apertures with one of the apertures of the second valve member, ramp and follower means for automatically moving the first and second valve members away from one another during changeover movement of the first valve member relative to the second valve member and releasable locking means for releasably locking the first valve member in alignment with a second aperture of the second valve member, wherein the releasable locking means comprises a catch on the first valve member engageable, in use, with a catch adjacent the second aperture of the second valve member.

10. Apparatus comprising a changeover valve comprising a first valve member having an aperture, a second valve member having two apertures, the first valve member being movable relative to the second valve member for selective alignment of the first valve member apertures with one of the apertures of the second valve member, ramp and follower means for automatically moving the first and second valve members away from one another during changeover movement of the first valve member relative to the second valve member, releasable locking means for releasably locking the first valve member in alignment with a second aperture of the second valve member and a catch adjacent the second aperture of the second valve member engageable with the first valve member.

11. Apparatus as claimed in claim 10, wherein the catch adjacent the second aperture of the second valve member is pivotable.

12. Apparatus as claimed in claim 10, further comprising a releasing member for releasing the locking means.

13. Apparatus as claimed in claim 12, wherein an actuating means is provided on the changeover valve for actuating the releasing member.

14. Apparatus as claimed in claim 10, wherein the apparatus is a vacuum cleaner.

15. Apparatus as claimed in claim 14, wherein the vacuum cleaner has a main body and a cleaner head and the changeover valve is operable by relative rotation of the main body with respect to the cleaner head.

16. A changeover valve as claimed in claim 1, wherein the first valve member comprises a seal and the ramp and follower means is configured so as to retract the seal away from the second valve member at a time during the changeover.

17. A changeover valve as claimed in claim 9, wherein the first valve member comprises a seal and the ramp and follower means is configured so as to retract the seal away from the second valve member at a time during the changeover.

18. A changeover valve as claimed in claim 10, wherein the first valve member comprises a seal and the ramp and follower means is configured so as to retract the seal away from the second valve member at a time during the changeover.

* * * * *